United States Patent [19]
Banks et al.

[11] Patent Number: 4,596,644
[45] Date of Patent: Jun. 24, 1986

[54] METHOD OF POLYMERIZATION

[75] Inventors: Christopher P. Banks, Saffron Walden; Edward Irving, Burwell, both of England

[73] Assignee: Ciba-Geigy Corporation, Ardsley, N.Y.

[21] Appl. No.: 752,287

[22] Filed: Jul. 5, 1985

[30] Foreign Application Priority Data

Jul. 14, 1984 [GB] United Kingdom ................. 8417966

[51] Int. Cl.$^4$ ............................................. C25D 13/00
[52] U.S. Cl. .................................. 204/181.6; 204/30; 204/59 R
[58] Field of Search ...................... 204/181.6, 30, 59 R

[56] References Cited

U.S. PATENT DOCUMENTS 4,297,188 10/1981 Daolio et al. ..................... 204/181.6
4,416,752 11/1983 Crivello ........................... 204/181 R

OTHER PUBLICATIONS

U. Akbulat et al, Makromol Chem. Rapid Commun. 4, 259 (1983).
U. Akbulat et al, British Polymer J, 15, 179 (1983).
A. M. Onal et al, British Polymer J, 15, 187 (1983).

*Primary Examiner*—R. L. Andrews
*Attorney, Agent, or Firm*—Luther A. R. Hall

[57] ABSTRACT

Cationically polymerizable materials, such as epoxide resins, phenoplasts, and aminoplasts, are polymerized by passing an electric current through a composition comprising
  (A) the cationically polymerizable material, and
  (B) a boron trifluoride complex,
    between an anode and a cathode in contact with the composition, whereby polymerized material is deposited on the anode.

Typical complexes (B) are those of boron trifluoride with primary, secondary, or tertiary amines or with trialkyl or triaryl phosphines.

The method is a particularly suitable means for coating conductive substrates, giving a rapid cure without the need for special formulations to render the polymers electrodepositable.

19 Claims, No Drawings

METHOD OF POLYMERIZATION

This invention relates to a method of polymerising cationically polymerisable materials and the use of this method in coating conductive surfaces, particularly metallic surfaces, by polymerisation of a cationically polymerisable material on the surface of an anode in the presence of a boron trifluoride complex.

Conducting substrates have previously been coated by means of cationically polymerisable materials in the presence of certain salts that decompose electrolytically. In U.S. Pat. No. 4,416,752, for example, there is claimed a coating method in which a conducting substrate is used as the anode in an electrolysed mixture of a cationically polymerisable organic material and an aryliodonium or arylsulphonium salt having an anion $MQ_d$, where M is a metal or metalloid selected from boron, phosphorus, antimony and arsenic, Q is a halogen, and d is 4–6, for example a tetrafluoroborate anion. Suitable cationically polymerisable materials include mono- and polyepoxides, vinyl compounds, cyclic ethers, cyclic esters, and their mixtures. The advantage of this process, compared with prior art polymer electrodeposition processes, is that the polymerisable materials themselves do not need to be specially formulated to make them electrodepositable.

The salts as described in this United States patent suffer from two drawbacks. Firstly, they are photosensitive, so that mixtures of cationically-polymerisable material and such salts have only a limited storage life unless kept in total darkness. Electrocoating baths containing these mixtures would need to be used under carefully controlled lighting conditions if premature gelation is to be avoided. The second drawback is that they are difficult to prepare and therefore expensive, so that large scale utilisation of the claimed coating process is not commercially feasible at the present time.

The use of a quaternary ammonium hexafluorophosphate or tetrafluoroborate as electrolyte for the electroinitiated cationic polymerisation of various epoxides is also known and is described by U. Akbulut et al., Makromol. Chem., Rapid. Commun. 4,259–261 (1983), U. Akbulut et al., British Polymer Journal, 15, 179–182 (1983), and A. M. Onal et al., British Polymer Journal, 15, 187–189 (1983). These papers described the polymerixation of epoxycyclohexane, 1,2-expoxy-4-epoxyethyl cyclohexane, epoxycyclopentane, and epoxy-styrene by constant potential electrolysis at a voltage of up to 3 volts over a period of about 1½ hours. The voltages were kept low in order in prevent the electrolyte salt form entering into the reaction.

It has now been found that the use of salts is not necessary since if they are replaced by commercially available, or easily prepared, complexes of boron trifluoride, rapid polymerisation of cationically polymerisable materials takes place when an electric current is passed through the mixtures.

It is inevitable in any electrolytic polymerisation process that traces of the polymerisation agent are retained within the polymerised resin. Where a salt is used, these traces adversely affect the electrical properties of the resin. A boron trifluoride complex, on the other hand, does not affect the electrical properties of the resin since it is covalently bonded. Further, traces of the complex retained in the polymerised resin enable post-curing to take place when the resin is heated.

Accordingly this invention provides a method of polymerising a cationically polymerisable material which comprises passing an electric current through a composition comprising
(A) the cationically polymerisable material, and
(B) a boron trifluoride complex,
between an anode and a cathode in contact with the composition, whereby polymerised material is deposited on the anode.

The method of the invention is particularly suitable for use in the coating of conductive substrates. Thus the invention further provides a method of coating a conductive substrate which comprise carrying out the polymerisation method of the invention using the conductive substrate as the anode.

The complexes of boron trifluoride that are used may be solid or liquid and are at least moderately stable on storage at ambient temperature, but readily form reactive species when an electric current is passed. Suitable complexes may be those with organic or inorganic materials, the former being preferred. Typical such organic complexes are those containing $BF_3$ with an alcohol, ether, acid, amine, amide, ester, or tri-substituted phosphine. Preferred complexes are those with amines, which can be primary, secondary or tertiary monoamines or polyamines, and can be N-heterocycles, amine-substituted heterocycles aliphatic, cycloaliphatic, or araliphatic, and phosphines substituted by three aliphatic or aromatic groups. Particularly preferred complexes are those with pyridine, piperidine, mono-, di-, and tri-ethylamine, mono-, di-, and tri-methylamine, isophorone-diamine, benzylamine, cyclohexylamine, trimethylhexamethylenediamine, N,N,N',N'-tetramethylhexamethylenediamine, trimethylphosphine and triphenylphosphine.

Any cationically polymerisable material may be cured or polymerised by admixture with a boron trifluoride complex and electroylsis as described. Such polymerisable material may be, for example, an oxetane, a thiirane, a dihydropyran, or a tetrahydrofuran. Preferably it is a 1,2-monoepoxide or episulphide having from 2 to 20 carbon atoms, such as ethylene oxide, ethylene sulphide, propylene oxide, or propylene sulphide, an epoxide resin, particularly a cycloaliphatic epoxide resin such as 3,4-epoxycyclohexymethyl 3',4'-epoxycyclohexanecarboxylate or its 6,6'-dimethyl derivative, ethylene glycol bis(3,4-epoxycyclohexanecarboxylate), bis(3,4-epoxycyclohexylmethyl) adipate, dicyclopentadiene dioxide or vinylcyclohexene dioxide, a polyglycidyl ether, which may have been advanced, of a polyhydric alcohol such as 1,4-butanediol or diethylene glycol, or of a polyhydric phenol such as 2,2-bis(4-hydroxyphenyl)propane or of a phenol-aldehyde novolak, a polyglycidyl ester of a polycarboxylic acid such as phthalic, tetrahydrophthalic, trimellitic or pyromellitic acid, a phenoplast, an aminoplast such as a urea-formaldehyde or melamine-formaldehyde resin, or other methylol compound, such as a poly(N-methylol) derivative of polycaroxylic acid amide. Ethylenically unsaturated materials that are cationically polymerisable may also be used, such as diketene, vinyl ethers, vinyl carbazole, or styrene.

The process of the invention is conveniently effected by mixing the polymerisable material with the complex in an organic or aqueous organic solvent, inserting a conductive material, for example, a material to be coated, as the anode, and a metal as the cathode, and passing a current until a suitable thickness of polymerised material has been deposited on the anode. This is then removed from the bath and dried, usually at elevated temperature. By reversing the current, or by using an alternating current, polymerised material can be deposited on both electrodes. The amount of complex used may vary between fairly wide limits but is normally 0.1% to 10% based on the weight of polymerisable material. The concentration of polymerisable material in the solution is usually from 5% to 50% by weight. The solution is preferably at ambient temperature, but it may be heated or cooled if desired, temperatures within the range 0° C. to 80° C. having been found to be satisfactory. Suitable solvents for this process include ketones, such as acetone, methyl ethyl ketone and methyl isobutyl ketone, alcohols such as methanol and ethanol, halogenated hydrocarbons such as dichloromethane, chloroform and tetrachloroethane, nitro-compounds such as nitromethane and nitrobenzene, mixtures of two or more thereof and, when they are water-miscible, mixtures of one or more thereof with water. Voltages used are usually within the range 5 V to 150 V, preferably 5 V to 100 V, for instance 15 V to 50 V or 50 V to 100 V, and the current required to effect a deposit that is from about 1 to about 30 micrometers thick is usually within the range 10 mA to 10 A.

As already indicated, the method of the invention is particularly suitable for use in the coating of a conductive substrate. Suitable substrates on which polymerised material may be deposited using the invention include metals, particularly ferrous metals such as steel and tinplate (tin-plated steel sheet), copper and aluminium, and metallised non-conductive materials such as metal-clad plastics laminates.

The invention will now be illustrated by reference to the following Examples, in which all parts are by weight.

EXAMPLE 1

2,2-Bis(4-glycidyloxyphenyl)propane, having an epoxide content of 5.2 equivalents/kg (1 part) and boron trifluoride monoethylamine complex (0.03 part) are dissolved in a mixture of dichloromethane (1 part) and acetone (1 part). Polymerised resin is deposited onto a tinplate anode, using a tinplate cathode, for 30 seconds at 30 volts, at room temperature in an electrolytic bath. The tinplate anode is removed from the bath and dried for 5 minutes at 90° C. This results in a tack-free deposit 10 micrometers thick.

When the example is repeated, but no current is passed, a tacky uncured deposit forms on the tinplate.

EXAMPLE 2

2,2-Bis(4-glycidyloxyphenyl)propane, having an epoxide content of 5.2 equivalents/kg (1 part) and boron trifluoride trimethylamine comlex (0.03 part) are dissolved in a mixture of dichloromethane (1 part) and acetone (1 part). Polymerised resin is deposited onto a tinplate anode, using a tinplate cathode, for 5 seconds at 30 volts in an electrolytic bath.

The anode is removed from the bath and dried for 5 minutes at 90° C. This results in a tack-free deposit 9 micrometers thick.

EXAMPLE 3

3,4-Epoxycyclohexylmethyl 3',4'-epoxycyclohexanecarboxylate (1 part) and boron trifluoride triphenylphoshpine complex (0.01 part) are dissolved in a mixture of dichloromethane (1 part) and acetone (1 part). Polymerised resin is deposited onto a tinplate anode, using a tinplate cathode, for 2 seconds at 100 volts in an electrolytic bath.

The anode is removed from the bath and dried for 5 minutes at 90° C. This results in a tack-free deposit 15 micrometers thick.

EXAMPLE 4

A phenol-fromaldehyde resole (1 part, P:F ratio 1:1.4) and boron trifluoride ethylamine complex (0.02 part) are dissolved in a mixture of acetone (1.5 parts) and water (1.5 parts). Polymerised resin is deposited onto a tinplate anode, using a tinplate cathode, for 30 seconds at 30 volts in an electrolytic bath.

The tinplate anode is removed from the bath an dried for 5 minutes at 90° C. This results in a tack-free deposit 7 micrometers thick.

EXAMPLE 5

(2,3-Dihydro-4H-pyran-2-yl)methyl 2,3-dihydro-4H-pryan-2-carboxylate (1 part) and boron trifluoride triphenylphosphine complex (0.02 part) are dissolved in a mixture of dichloromethane (1 part) and acetone (1 part). Polymerised resin is deposited onto a tinplate anode, using a tinplate cathode, for 5 seconds at 100 volts in an electrolytic bath.

The tinplate anode is removed from the bath and dried for 5 minutes at 90° C. This results in a tack-free deposit 8 micrometers thick.

EXAMPLE 6

3,4-Epoxycyclohexylmethyl 3',4'-epoxycyclohexane carboxylate (1 part) and boron trifluoride isophoronediamine complex (0.03 part) are dissolved in a mixture of acetone (1 part) and methanol (1 part). Polymerised resin is deposited onto a copper-clad laminate anode, using a tinplate cathode, for 10 seconds at 30 volts in an electrolytic bath.

The copper-clad laminate is removed from the bath and dried for 5 minutes at 90° C. This results in a tack-free deposit 9 micrometers thick.

When the example is repeated, but no current is passed, a tacky uncured deposit forms on the copper-clad laminate anode.

EXAMPLE 7

3,4-Epoxycyclohexylmethyl 3',4'-epoxycyclohexane carboxylate (1 part) and boron trifluoride trimethylhexamethylenediamine complex (0.02 part) are dissolved in a mixture of acetone (1 part) and methanol (1 part). Polymerised resin is deposited onto a copper-clad laminate anode, using a tinplate cathode, for 5 seconds at 30 volts in an electrolytic bath.

The copper-clad laminate anode is removed from the bath and dried for 5 minutes at 90° C. This results in a tack-free deposit 8 micrometers thick.

When the example is repeated, but no current is passed, a tacky uncured deposit forms on the copper-clad laminate anode.

EXAMPLE 8

2,2-Bis(4-glycidyloxyphenyl)propane, having an epoxide content of 5.2 equivalents/kg (1 part) and boron trifluoride piperidine complex (0.03 part) are dissolved in a mixture of acetone (1 part) and methanol (1 part). Polymerised resin is deposited onto a steel anode, using a tinplate cathode, for 5 seconds at 20 volts in an electrolytic bath.

The steel anode is removed from the bath and dried for 5 minutes at 90° C. This results in a tack-free deposit 5 micrometers thick.

When the example is repeated, but no current is passed, a tacky uncured deposit forms on the steel anode.

EXAMPLE 9

2,2-Bis(4-glycidyloxyphenyl)propane, having an epoxide content of 5.2 equivalents/kg (1 part) and boron trifluoride benzylamine complex (0.03 part) are dissolved in a mixture of acetone (1 part) and methanol (1 part). Polymerised resin is deposited onto an aluminium anode, using a tinplate cathode, for 60 seonds at 80 volts in an electrolytic bath.

The aluminium anode is removed from the bath and dried for 5 minutes at 90° C. This results in a tack-free deposit 3 micrometers thick.

When the example is repeated, but no current is passed, a tacky uncured deposit forms on the aluminium anode.

EXAMPLE 10

2,2-Bis(4glycidyloxyphenyl)propane, having an epoxide content of 5.2 equivalents/kg (1 part) and boron trifluoride diethylamine complex (0.02 part) are dissolved in a mixture of acetone (1 part) and methanol (1 part). Polymerised resin is deposited onto a copper-clad laminate anode, using a tinplate cathode, for 10 seconds at 30 volts in an electrolytic bath.

The copper-clad laminate anode is removed from the bath and dried for 5 minutes at 90° C. This results in a tack-free deposit 5 micrometers thick. When the example is repeated, but no current is passed, a tacky uncured deposit forms on the copper-clad laminate anode.

EXAMPLE 11

2,2-Bis(4-glycidyloxyphenyl)propane, having an epoxide content of 5.2 equivalents/kg (1 part) and boron trifluoride pyridine complex (0.03 part) are dissolved in a mixture of acetone (1 part) and methanol (1 part). Polymerised resin is deposited onto a tinplate anode, using a tinplate cathode, for 10 seconds at 30 volts in an electrolytic bath. The tinplate anode is removed from the bath and dried for 5 minutes at 90° C. This results in a tack-free deposit 8 micrometers thick.

When the example is repeated, but no current is passed, a tacky uncured deposit forms on the tinplate anode.

What is claimed is:

1. A method of polymerizing a cationically polymerizable material which comprises passing an electric current through a composition comprising
   (A) the cationically polymerizable material, and
   (B) a boron trifluoride complex,
   between an anode and a cathode in contact with the composition, whereby polymerized material is deposited on the anode.

2. A method as claimed in claim 1 in which the boron trifluoride complex is one with an alcohol, ether, acid, amine, ester, or tri-substituted phosphine.

3. A method as claimed in claim 2 in which the boron trifluoride complex is one with an amine which is a heterocycle, amine-substituted heterocycle, aliphatic, cycloaliphatic, or araliphatic or with a phosphine substituted by three aliphatic or aromatic groups.

4. A method as claimed in claim 3 in which the boron trifluoride complex is one with pyridine, piperidine, mono-, di-, or tri-ethylamine, mono-, di-, or tri-methylamine, isophoronediamine, benzylamine, cyclohexylamine, trimethylhexamethylenediamine, N,N,N,',N'-tetramethylhexamethylenediamine, trimethylphosphine or triphenylphosphine.

5. A method as claimed in claim 1, in which the cationically polymerizable material is an oxetane, thiirane, dihydropyran, tetrahydrofuran, 1,2-monoepoxide or episulfide having from 2 to 20 carbon atoms, epoxide resin, phenoplast, aminoplast or ethylenically unsaturated material.

6. A method as claimed in claim 1, in which the cationically polymerizable material is epoxide resin and is a cycloaliphatic epoxide resin, a polyglycidyl ether, or an advanced polyglycidyl ether, of a polyhydric alcohol or a polyhydric phenol, or a polyglycdyl ester of a polycarboxylic acid.

7. A method as claimed in claim 1, wherein there is used 0.1 to 10% by weight of the complex, based on the weight of the polymerizable material.

8. A method as claimed in claim 1 that is effected by mixing the polymerizable material with the complex in an organic or aqueous organic solvent, inserting a conductive material as the anode and a metal as the cathode and passing a current until a suitable thickness of polymerizable material has been deposited on the anode.

9. A method as claimed in claim 8 in which the concentration of polymerizable material in solution is from 5% to 50% by weight.

10. A method as claimed in claim 8 which is effected at a temperature within the range 0° C. to 80° C.

11. A method as claimed in claim 8 in which the solvent is a ketone, an alcohol, a halogenated hydrocarbon, a nitro compound, a mixture of two or more thereof or, where water-miscible, a mixture of one or more thereof with water.

12. A method as claimed in claim 1, in which the voltage used is 5 V to 150 V.

13. A method as claimed in claim 1, in which the voltage used is 5 V to 100 V.

14. A method as claimed in claim 1, in which the voltage used is 15 V to 50 V.

15. A method as claimed in claim 1, in which the voltage used in 50 V to 100 V.

16. A method as claimed in claim 1, in which a conductive substrate to be coated is used as the anode.

17. A method as claimed in claim 16, in which the conductive substrate is a metal or a metallised non-conductive material.

18. A material polymerized by a method as claimed in claim 1.

19. A conductive substrate coated by a method as claimed in claim 16.

* * * * *